United States Patent
Thomas (10) Patent No.: US 10,088,052 B2
(45) Date of Patent: Oct. 2, 2018

(54) METHOD OF MANUFACTURING A SEAL

(71) Applicant: Michael Thomas, Sycamore, IL (US)

(72) Inventor: Michael Thomas, Sycamore, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 382 days.

(21) Appl. No.: 14/861,527

(22) Filed: Sep. 22, 2015

(65) Prior Publication Data
US 2017/0082201 A1   Mar. 23, 2017

(51) Int. Cl.
| | |
|---|---|
| *F16J 15/3268* | (2016.01) |
| *F16J 15/3216* | (2016.01) |
| *F16J 15/3252* | (2016.01) |
| *F16J 15/328* | (2016.01) |
| *F16J 15/3276* | (2016.01) |

(52) U.S. Cl.
CPC ......... *F16J 15/3268* (2013.01); *F16J 15/328* (2013.01); *F16J 15/3216* (2013.01); *F16J 15/3252* (2013.01); *F16J 15/3276* (2013.01); *Y10T 29/49297* (2015.01)

(58) Field of Classification Search
CPC .. F16J 15/3264; F16J 15/3276; F16J 15/3252; F16J 15/3268; F16J 15/3208; F16C 33/72; F16C 33/805; F16C 33/7876; F16C 33/7823; F16C 33/783; Y10T 29/49297

See application file for complete search history.

(56) References Cited

U.S. PATENT DOCUMENTS

| | | | |
|---|---|---|---|
| 4,304,414 A | 12/1981 | Forch |
| 4,623,153 A | 11/1986 | Nagasawa |
| 4,664,392 A | 5/1987 | Hatch |
| 4,721,314 A | 1/1988 | Kanayama |
| 4,822,059 A | 4/1989 | Shimasaki |
| 4,943,068 A | 7/1990 | Hatch |
| 5,052,696 A | 10/1991 | Hatch |
| 6,123,514 A | 9/2000 | Kawaguchi |

(Continued)

OTHER PUBLICATIONS

Non-Final Office Action dated Jul. 15, 2016, U.S. Appl. No. 14/867,145, filed Sep. 28, 2015, pp. 1-8.

(Continued)

*Primary Examiner* — Sarang Afzali
(74) *Attorney, Agent, or Firm* — Mark Ussai; SKF USA Inc. Patent Dept.

(57) ABSTRACT

The method includes providing a generally annular sealing element, the sealing element having an inner circumferential sealing surface configured to engage with a relatively movable member, and an outer casing blank including one of: a generally axially-extending section and a generally radially-extending section extending inwardly from the axially-extending section; and a generally annular disk and a generally cylindrical tube. The method may also include determining a desired diameter for a generally annular outer casing, removing a portion of the provided one of the radially-extending section and the annular disk, such that a diameter of the outer casing blank is about equal to the desired diameter, and coupling the sealing element to the outer casing blank after removing the portion of the provided one of the radially-extending section and the disk.

15 Claims, 8 Drawing Sheets

(56) References Cited

U.S. PATENT DOCUMENTS

| | | | |
|---|---|---|---|
| 6,209,879 B1 | 4/2001 | Mizunoya | |
| 6,387,810 B2 | 4/2002 | Hatch | |
| 6,517,083 B2 | 2/2003 | Yamada | |
| 6,840,521 B2 | 1/2005 | Ikeda | |
| 6,945,540 B2 * | 9/2005 | Bormann | B60J 10/233 277/644 |
| 7,753,377 B2 | 7/2010 | Laplante | |
| 8,028,415 B2 * | 10/2011 | Clark | F16J 15/3256 277/551 |
| 8,256,772 B2 | 9/2012 | Itadani | |
| 8,579,297 B2 | 11/2013 | Arita | |
| 8,602,419 B2 * | 12/2013 | Namuduri | F16J 15/3212 277/309 |
| 2002/0185822 A1 | 12/2002 | Spain | |
| 2009/0134585 A1 | 5/2009 | Shimomura | |
| 2010/0244389 A1 | 9/2010 | Sanada | |
| 2011/0121513 A1 * | 5/2011 | Lechler | B23P 19/084 277/300 |
| 2011/0316235 A1 * | 12/2011 | Epshetsky | F16J 15/3244 277/300 |
| 2013/0069314 A1 * | 3/2013 | Battles | F16J 15/3268 277/300 |
| 2013/0234402 A1 * | 9/2013 | Fietz | F16J 15/002 277/549 |
| 2014/0062031 A1 | 3/2014 | Honzek | |
| 2014/0151967 A1 | 6/2014 | Benedix | |

OTHER PUBLICATIONS

Non-Final Office Action dated Jun. 17, 2016, U.S. Appl. No. 14/824,415, filed Aug. 12, 2015, pp. 1-9.

\* cited by examiner

METHOD OF MANUFACTURING A SEAL

BACKGROUND

Radial seals are used in a variety of industrial contexts. For example, seals may be used to protect a bearing from contaminants and maintain grease or oil therein. The seals generally include a flexible element that engages (or nearly engages) a rotating element, often a shaft, and a more rigid element that connects with a housing or another generally stationary body. The seal thus allows the shaft to rotate (or otherwise move) relative to the housing, while maintaining a seal.

Many different sizes of seals are employed in different machines. Seals are thus often custom-designed for the particular machine in which they are used. Accordingly, relatively small customer orders for such seals may present a challenge, because it may not be practical to maintain a large inventory of every conceivable size and/or configuration of seal. Thus, such small orders may result in essentially a custom manufacturing run of the ordered seal. Typically, manufacturers react by attempting to simplify the manufacturing process, reducing the part count wherever possible. While this may be effective in some contexts, the challenge of inventory limitations may persist, and such small runs may make the seal manufacturing process less economical.

SUMMARY

Embodiments of the present disclosure may provide methods for manufacturing a seal for sealing around a relatively movable member (e.g., a shaft. The method may include, for example, providing a generally annular sealing element, the sealing element having an inner circumferential sealing surface configured to engage with a relatively movable member, and an outer casing blank including one of: a generally axially-extending section and a generally radially-extending section extending inwardly from the axially-extending section; and a generally annular disk and a generally cylindrical tube. The method may also include determining a desired diameter for a generally annular outer casing, removing a portion of the provided one of the radially-extending section and the annular disk, such that a diameter of the outer casing blank is about equal to the desired diameter, and coupling the sealing element to the outer casing blank after removing the portion of the provided one of the radially-extending section and the disk.

Embodiments of the present disclosure may also include a kit for a seal. The kit may include a generally annular outer casing blank having an outer diameter configured to engage a bore of a certain diameter, and a generally annular sealing element that is separate from and connectable with at least a portion of the outer casing blank, the sealing element blank having a lip that is modifiable to seal with a shaft having a diameter within a range of diameters.

BRIEF DESCRIPTION OF THE DRAWINGS

The accompanying drawings, which are incorporated in and constitutes a part of this specification, illustrates an embodiment of the present teachings and together with the description, serves to explain the principles of the present teachings. In the figures.

It should be noted that some details of the figures have been simplified and are drawn to facilitate understanding of the embodiments rather than to maintain strict structural accuracy, detail, and scale.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B." As the term is used herein, "about equal" generally refers to two things (e.g., measurements) which are equal to each other taking into consideration a reasonable tolerance dependent upon the application, circumstances, etc.

Figure 1:
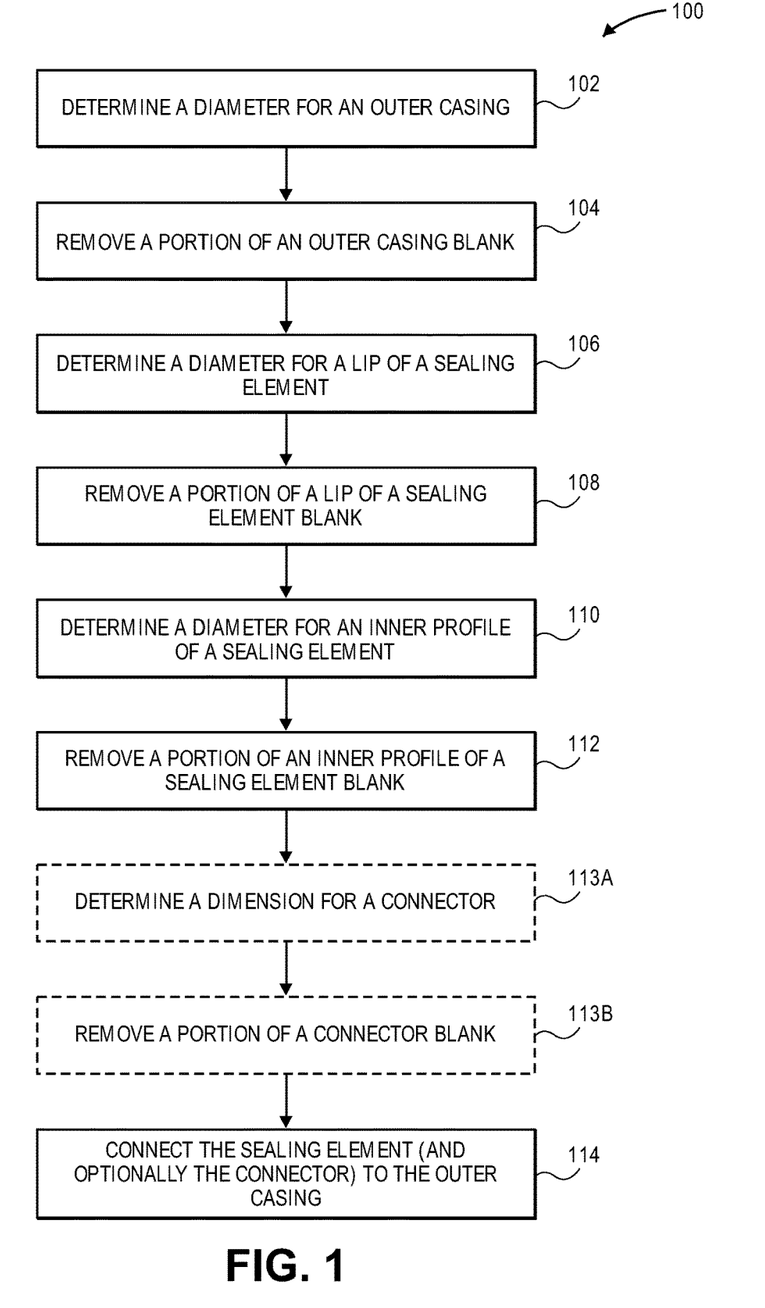
FIG. 1 illustrates a flowchart of a method for manufacturing a seal, according to an embodiment.

FIG. 1 illustrates a flowchart of a method 100 for manufacturing a seal, according to an embodiment. The seal that is manufactured by execution of the method 100 may be generally annular, in which case, by definition, has an inner diameter and an outer diameter. However, such a generally annular seal may be continuous, segmented, uniform, or differing in shape or structure as proceeding in a circumferential direction, without departing from the scope of the term "generally annular."

Figure 2A:
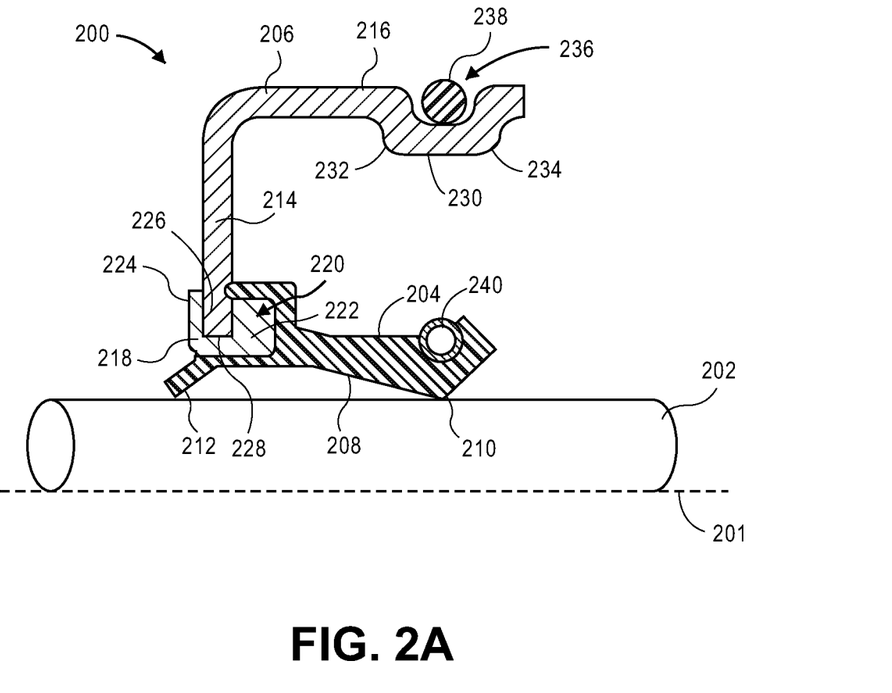
FIGS. 2A and 2B each illustrate a partial, side, cross-sectional view of a seal, according to two embodiments.

Before further describing the method 100, two embodiments of the seal that may be manufactured thereby will be described. In particular, FIG. 2A illustrates a partial, side, cross-sectional view of an example of such a generally annular seal 200, illustrated disposed around a central axis 201 and sealing with a relatively movable member, e.g., a rotatable shaft 202. The seal 200 includes a sealing element 204 and an outer casing 206. The sealing element 204 may be formed from a relatively soft, flexible material, so as to form the seal with the shaft 202. Examples of such materials include rubber, other elastomers, polymers, plastics, fiber-reinforced materials (i.e., "composites"), or the like.

The sealing element 204 may also include an inner diameter surface 208, which may be configured to seal with the shaft 202. More particularly, the inner diameter surface 208 may define an inner profile 210, which may protrude radially-inward and be engageable with the shaft 202. The inner profile 210 may thus define a minimum inner diameter of the sealing element 204. Further, the inner diameter surface 208 may include a sealing lip 212, which may also extend radially-inward, and may also define the minimum inner diameter of the sealing element 204; however, in some embodiments, the inner diameter of the sealing lip 212 may be different from the inner diameter of the inner profile 210.

The outer casing 206 may be formed from a more rigid material, such as a metal, alloy, composite, polymer, plastic, or combination thereof. The outer casing 206 may have a first section 214 that extends generally radially (e.g., disk-shaped), and a second section 216 that extends generally axially (e.g., tubular-shaped). In the illustrated embodiment, the first and second sections 214, 216 are integral, but in other embodiments, they may be provided by two separate members that are attached or attachable together.

The seal 200 may also include a connecting insert 218, which may be at least partially received into a pocket 220 formed in the sealing element 204. In an embodiment, the connecting insert 218 may be received into a mold, and the sealing element 204 may be formed (molded) at least partially around the insert 218. The insert 218 may additionally include an adhesive that bonds (adheres) the insert 218 with the sealing element 204. The pocket 220 may engage one, two, three, or more sides of the insert 218, and may fully envelope the insert 218. Further, the insert 218 may be formed from a material having a higher melting point than the sealing element 102, and may have a greater rigidity than the sealing element 102.

The sealing element 204 may be coupled with the outer casing 206 via the insert 218. For example, the insert 218 may include a base 222 and a crimping extension 224 that extends from the base 222. The base 222 may be fixed with the sealing element 204, e.g., positioned at least partially in the pocket 220. Initially, the crimping extension 224 may extend generally axially from the base 222. A radially-inner portion 226 of the outer casing 206, e.g., extending radially-outward from an inner diameter surface 228 of the outer casing 206, may be received into the insert 218, adjacent to the base 222. The crimping extension 224 may then be bent radially outward, such that the crimping extension 224 and the base 222 entrain the outer casing 206 therebetween via an interference connection with the radially-inner portion 226 of the outer casing 206.

The outer casing 206, e.g., the second section 216 thereof, may define a ridge 230 between two bends 232, 234 in the outer casing 206. On the radial outside of the ridge 230, the outer casing 206 may define a recess 236 in which an outer sealing element 238 (e.g., an O-ring) may be positioned to seal with a bore of a housing in which the seal 200 may be disposed. The seal 200 may also include a spring 240 that bears against the sealing element 204, applying a radially-inward force thereof, e.g., to maintain engagement of the inner profile 210 with the shaft 202.

Figure 2B:
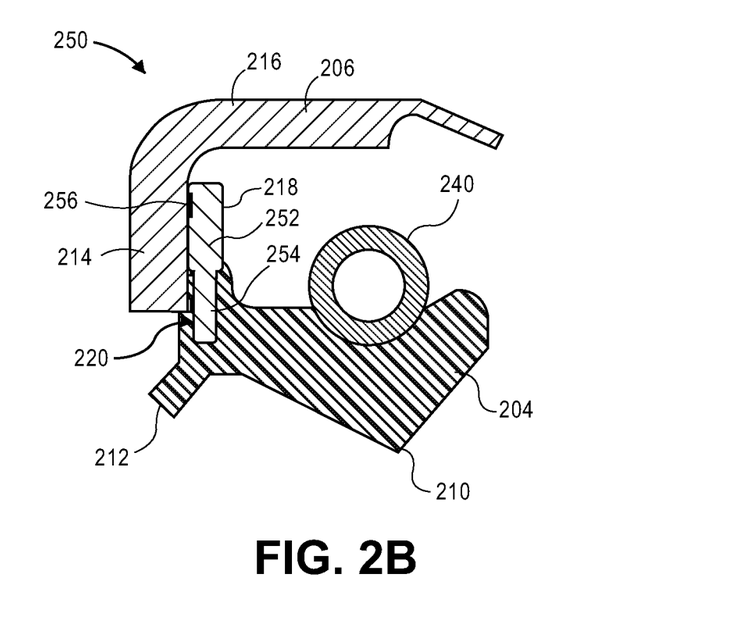

FIG. 2B illustrates a partial, side, cross-sectional view of another seal 250, according to an embodiment. The seal 250 may be similar to the seal 200 and like components are given like numbers and duplicative descriptions are generally omitted.

The insert 218 of the seal 250 may include a radial extension 252 and a radial base 254. The radial base 254 may be positioned in the pocket 220 of the sealing element 204, with the sealing element 204 being molded around and, e.g., bonded to the radial base 254. The radial extension 252 may extend radially-outward from the radial base 254, and out of the pocket 220. The radial extension 252 may extend generally parallel to the first section 214 of the outer casing 206 and may be in engagement therewith. Further, the radial extension 252 may be connected to the first section 214 of the outer casing 206, e.g., at a connection location 256. The connection location 256 may be the site of a welding, a soldering, a bonding, or any other connection device or structure.

Referring again to FIG. 1, the method 100 of manufacturing the seal (e.g., the seal 200 or 250) may begin by determining a diameter for an outer casing, as at 102. The diameter may, for example, be an inner diameter. Further, the diameter may be determined according to a known shaft size, a customer specification, or in any other way. With the diameter selected, the method 100 may proceed to removing a portion of an outer casing blank, as at 104, to generate the outer casing for the seal.

Figure 3:
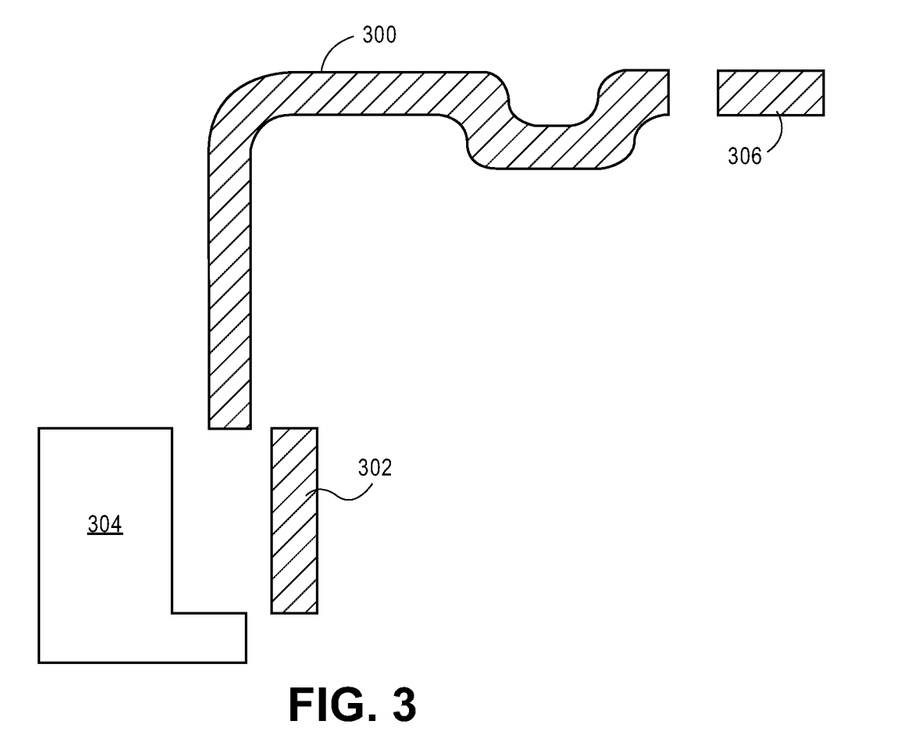
FIG. 3 illustrates a process of removing a portion of an outer casing blank, e.g., to form the outer casing of the seal of FIG. 2A, according to an embodiment.

FIG. 3 illustrates the process of removing a portion of an outer casing blank 300, as at 104, according to an embodiment. The outer casing blank 300 may have the same general shape as the outer casing 206 discussed above with reference to FIG. 2A. In other embodiments, the outer casing blank 300 may require further forming operations (e.g., forming the ridge 230 and/or bending or otherwise forming the outer casing 206 to provide the first and second sections 214, 216) to generate the outer casing 206.

An inner diameter of the outer casing blank 300 may be smaller than the determined inner diameter size. Accordingly, a radially-inner portion 302 of the outer casing blank 300 may be removed, as shown, thereby enlarging the inner diameter to the determined size. In an embodiment, a die 304 may be used to remove the radially-inner portion 302, but in other embodiments, the radially-inner portion 302 may be removed by a lathe, mill, drill, laser cutter, other machining process and/or devices, etc. Further, an axial length of the outer casing blank 300 may be reduced by removing an axial portion 306 of the outer casing blank 300, e.g., proximal to an axial end of the outer casing blank 300. The axial portion 306 may be removed such that the axial dimension of the casing blank 300 is sized to fit into a bore of a housing. Further, the axial portion 306 may be removed prior to connecting the casing blank 300 with the insert 218 (e.g., FIG. 2A), e.g., to avoid damaging the sealing element 204 during the removal process.

Once the outer casing blank 300 is cut to size and/or any other forming operations are conducted, the outer casing blank 300 may provide the outer casing 206 of the seal 200 shown in, by way of example, FIG. 2A.

Referring again to FIG. 1, the method 100 may proceed to determining a diameter for a lip of a sealing element, as at 106. In an embodiment, the diameter may be an inner diameter, e.g., prescribed to facilitate the lip of the sealing element sliding over and sealing with a shaft or another relatively movable member. Further, the diameter may be determined according to a known shaft size, a customer specification, or in any other way.

Figure 4:
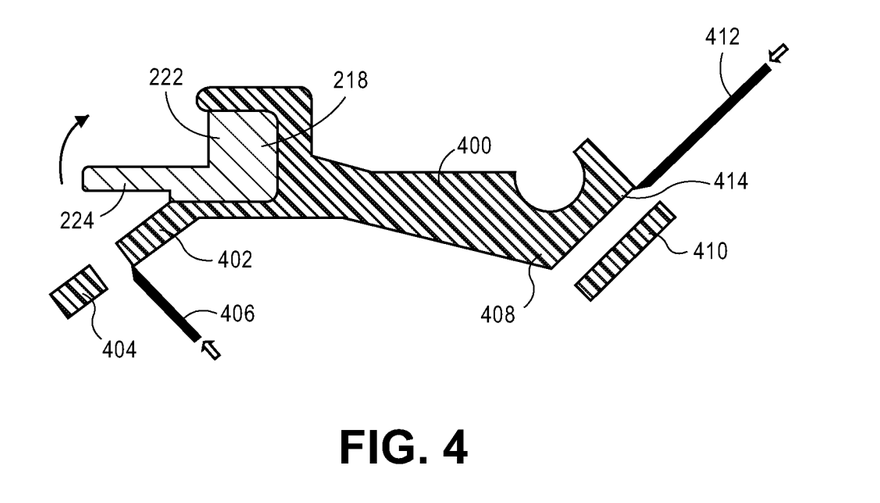
FIG. 4 illustrates a process of removing two portions of a sealing element blank, e.g., to form the sealing element of the seal of FIG. 2A, according to an embodiment.

The method 100 may then proceed to removing a portion of a lip of a sealing element blank, as at 108. FIG. 4 illustrates a view of a sealing element blank 400, in partial cross-section, with a portion of a sealing lip 402 thereof being cut to size, according to an embodiment. In particular, a radially-inner portion 404 of the lip 402 may be removed, e.g., by a cutting tool 406. The cutting tool 406 may be a physical tool, such as a sharp edge (as on a knife, die, etc.), or may be a laser, a heat source, etc.

The method 100 may also include determining a diameter for an inner profile of the sealing element, as at 110. The diameter may be an inner diameter, and may be the same or different from the diameter determined for the sealing lip. Further, the diameter may be determined according to a known shaft size, a customer specification, or in any other way.

The method 100 may then proceed to removing a portion of an inner profile of the sealing element blank 400, as at 112. It will be appreciated that such removal at 112 may occur before, after, or during removal of the portion of the sealing lip at 108. As shown in FIG. 4, the sealing element blank 400 includes an inner profile 408. A portion 410 of the inner profile 408 may be removed, e.g., using a cutting tool 412 or another implement (laser, heat source, etc.). As shown, the removal of the portion 410 may be conducted such that the inner profile 408 may retain a radial-inward protrusion, e.g., to a narrow ridge. This may be achieved by removing from an axial end 414 of the sealing element blank 400, while maintaining either a fixed or a variable angle that is controlled as it goes around the circumference with respect to a remainder of the inner profile 408.

Once the sealing lip 402 and/or the inner profile 408 are cut to size (and/or any other forming operations desired are conducted) the sealing element blank 400 may provide the sealing element 204 shown in, by way of example, FIG. 2A.

In some embodiments, the method 100 may then proceed to connecting or otherwise coupling the sealing element with the outer casing, as at 114. In other embodiments, optional processes, as indicated at 113A and 113B may be executed, as will be discussed below. In an embodiment, as depicted in FIG. 2A, the radially inner portion 226 of the outer casing 206 may be received adjacent to the base 222 of the connecting insert 218. As indicated by the arrow in FIG. 4, the crimping extension 224 may then be bent radially outward, so as to entrain the radially inner portion 226 of the outer casing 206 between the base 222 and the crimping extension 224. In other embodiments, the insert 218 may be otherwise attached to the outer casing 206 via other processes and/or devices, such as by welding, soldering, bonding, fastening, etc. (e.g., as in FIG. 2B).

Figure 5:
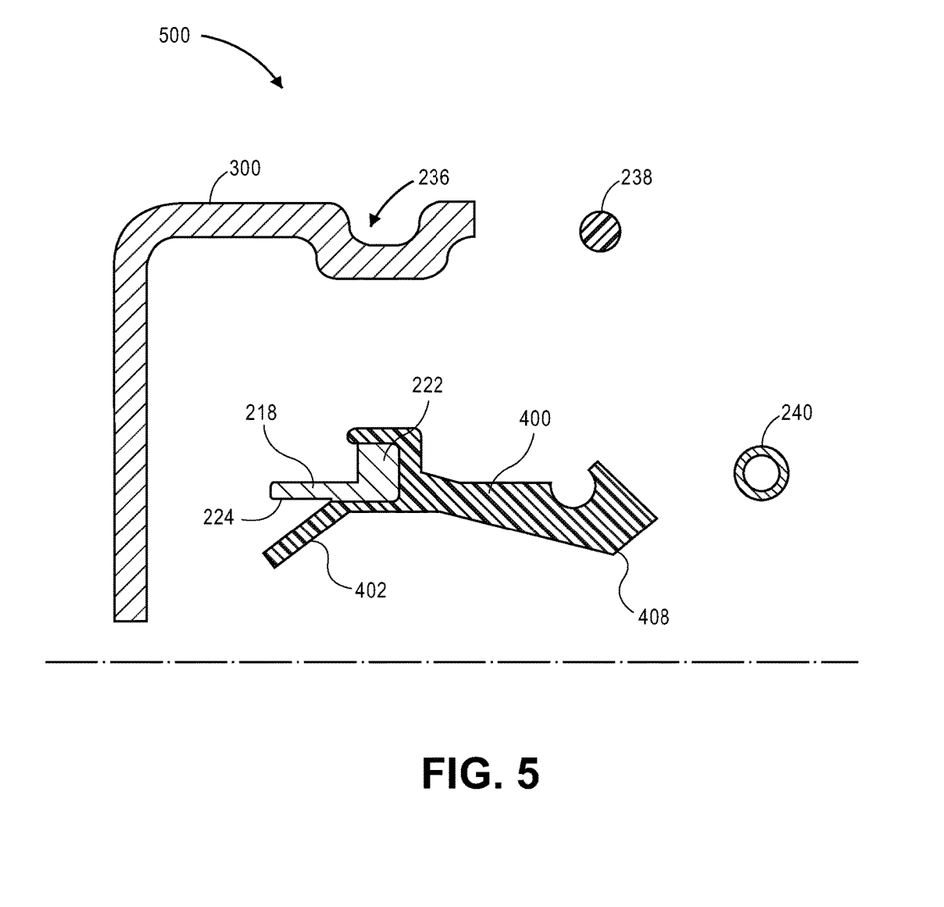
FIG. 5 illustrates a partial, side, cross-sectional view of a kit for a seal, according to an embodiment.

The method 100 may facilitate efficient assembly of a modular seal 200. Accordingly, in some cases, a kit 500, as shown in FIG. 5, may be provided. The kit 500 may include the outer casing blank 300, from which a radially-inner portion may be removed for use in a variety of different applications. In other embodiments, the radially-inner portion may have already been removed. Further, the outer casing blank 300 may have the shape of the finished outer casing 206, but in other embodiments, may require additional formation operations to achieve the finished outer casing 206.

Additionally, the kit 500 may include the sealing element blank 400, with the sealing lip 402 and the inner profile 408 that may be cut or otherwise have a portion thereof removed. As such, in some embodiments, the sealing element blank 400 may allow for application across a range of prescribed inner diameters, while in other cases the sealing element blank 400 may allow for a determined target amount of interference fit or engagement with a fixed, determined shaft size. In some cases, either or both of the sealing lip 402 and/or the inner profile 408 may have already been cut to a predetermined size.

Further, the kit 500 may include the connecting insert 218, which may be molded and/or bonded (adhered) to the sealing element blank 400. In an embodiment, the connecting insert 218 may include the crimping extension 224, which may be positioned at a generally axial orientation, and may be configured to be bent radially outward and toward the base 222, to couple the sealing element blank 400 with the outer casing blank 300, e.g., after removing the portions thereof.

The kit 500 may include one or more other components that may be employed with the outer casing blank 300 and the sealing element blank 400. For example, the kit 500 may include the outer sealing element 238, as well as the spring 240, which may be assembled with the recess 236 of the outer casing blank 300 and the sealing element blank 400, respectively.

Figure 6:
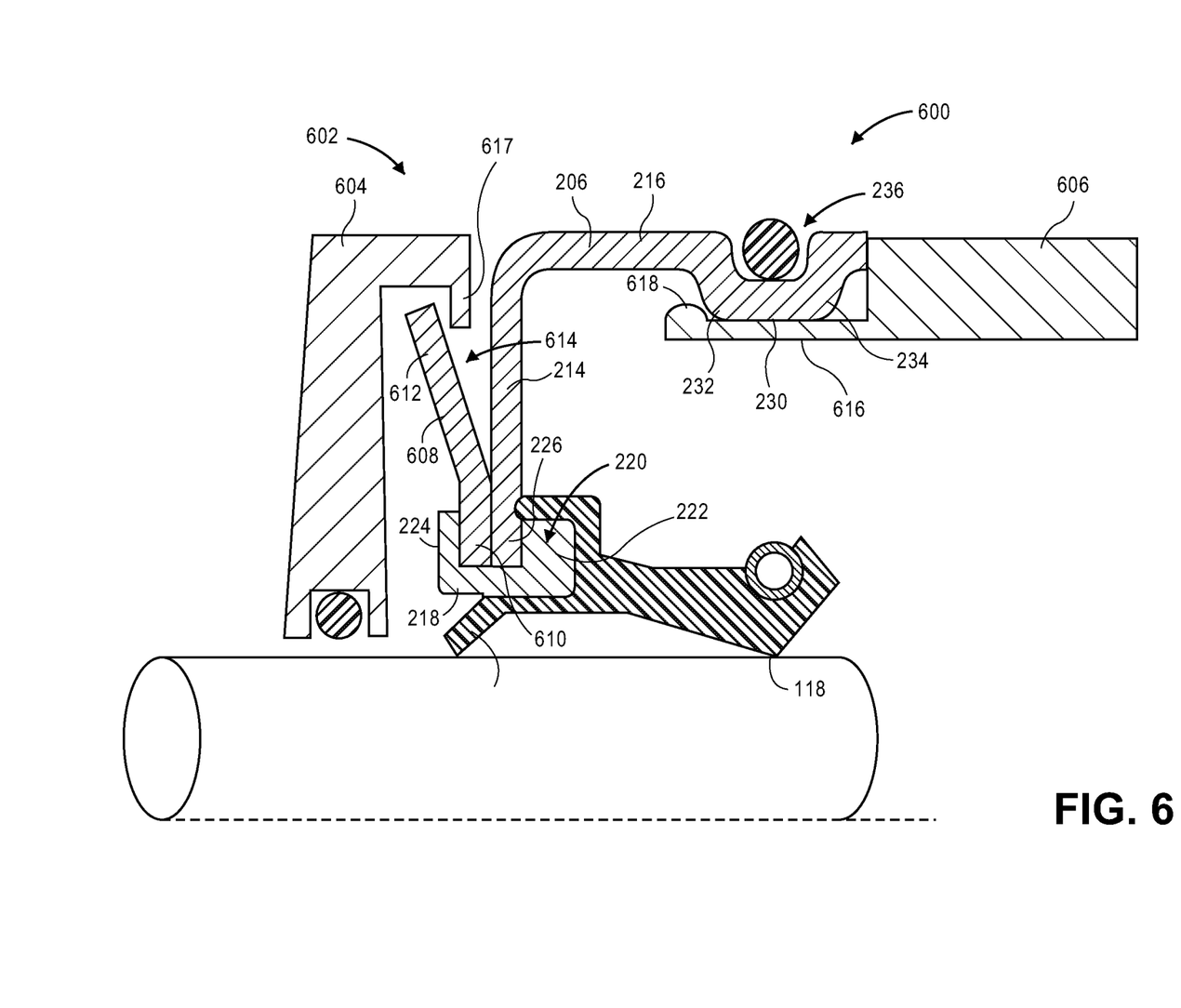
FIG. 6 illustrates a partial, side, cross-sectional view of a seal, according to an embodiment.

FIG. 6 illustrates a partial, side, cross-sectional view of another seal 600, according to an embodiment. The seal 600 may be generally similar to the seal 200, and like elements are indicated with like reference numbers and duplicative descriptions are generally omitted. The seal 600 may form part of a seal assembly 602, which may include one or more accessories (two are shown: 604, 606) in addition to the seal 600, with the accessories 604, 606 being connectable to the seal 600. The accessories may provide a secondary exclusionary device (e.g., a shield, a deflector, a fluid filter, or a dust cover), spacer, a secondary shaft seal, etc.

In some embodiments, the connecting insert 218 may serve as an engaging feature for connecting the accessory 604 with the seal 600. For example, the seal assembly 602 may additionally include a connector 608, for connecting the accessory 604 with the seal 600. A radially inner portion 610 of the connector 608 may be received between the crimping extension 224 and the radially-inner portion 226 of the outer casing 206, and may be entrained thereby pressure applied by the bending of the crimping extension 224 during assembly.

The connector 608 may additionally include a frustoconical portion 612, which may extend radially outward from the radially inner portion 610, and may extend axially away from the first section 215 of the outer casing 206, forming a gap 614 therebetween. A hook 617 of the accessory 604 may be received around the connector 608 and into the gap 614, so as to maintain a relative position (e.g., axial, radial, and/or rotational) of the accessory 604 with respect to the seal 600.

The ridge 230 may also serve as an engaging feature, e.g., for connecting the accessory 606 to the seal 600. For example, the accessory 606 may include a deflectable portion 616 and a protrusion 618 extending radially therefrom. The deflectable portion 616 may be deflected radially-inward during assembly with the seal 600, such that the protrusion 618 is able to slide radially within and axially past the ridge 230. Once axially past the ridge 230, the deflectable portion 616 may resiliently expand, such that the protrusion 618 engages the bend 232 to prevent axial, radial, and/or rotational displacement of the accessory 606 relative to the seal 600. In some embodiments, the deflectable portion 616 may be made from a resilient material that may elastically expand in a radial direction after being collapsed for insertion. In some embodiments, the deflectable portion 616 may have a relatively small thickness as compared to a remainder of the accessory 606. In some embodiments, the deflectable portion 616 may extend continuously around the central axis 601, but in other embodiments, may be segmented into a plurality of circumferentially spaced apart fingers, to facilitate deflection.

Referring again to FIG. 1, in an embodiment, the method 100 may additionally include determining a dimension (e.g., inner diameter, outer diameter, or both) of the connector 608, as at 113A (FIG. 1) and removing a portion of the connector 608 to meet the determined dimension, as at 113B. As such, in some embodiments, the connector 608 (and/or either or both of the accessories 604, 606) may be provided as part of the kit 500. It will be appreciated, however, that the inclusion of the connector 608 in the method 100 and/or in the kit 500 is optional. Once formed, the connector 608 may then be connected with the casing, along with the sealing element, as at 114.

Figure 7:
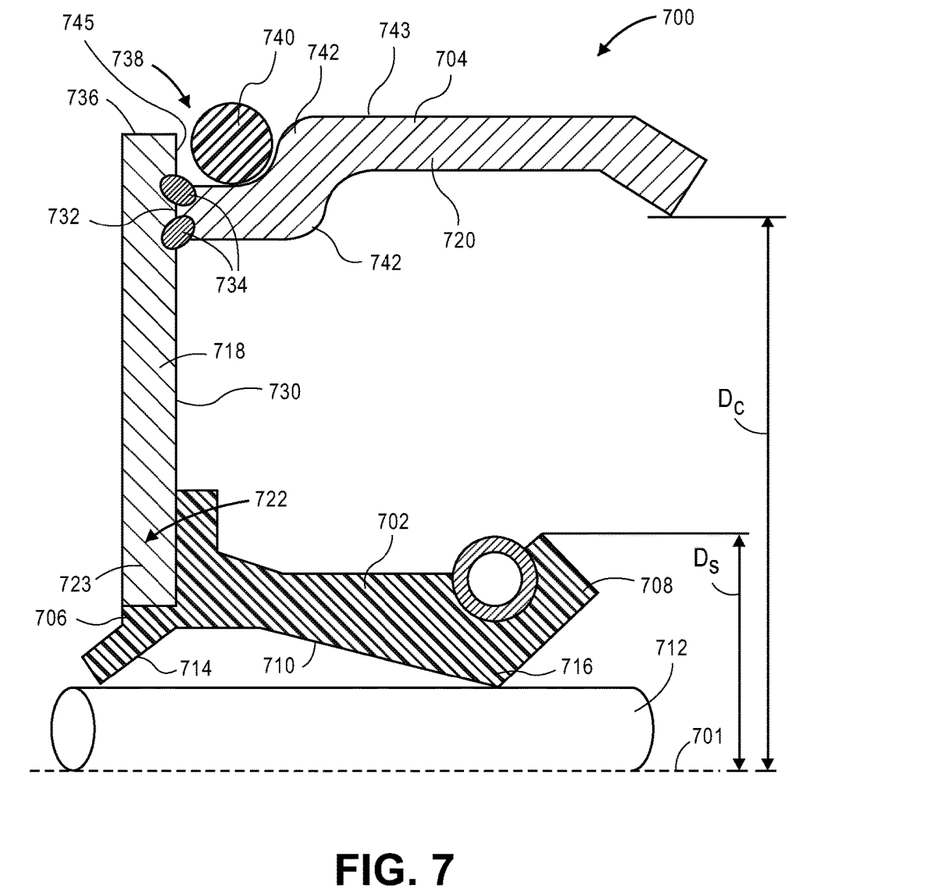
FIG. 7 illustrates a partial, side, cross-sectional view of another seal, according to an embodiment.

FIG. 7 illustrates a side, cross-sectional view of another seal 700, according to an embodiment. The seal 700 may include a sealing element 702 and an outer casing 704, with the sealing element 702 being coupled with the outer casing 704, as will be described below. The sealing element 702 may extend axially (i.e., parallel to the longitudinal axis 701) between first and second axial ends 706, 708 and may define an inner diameter surface 710. The inner diameter surface 710 may extend axially along a relatively movable member, e.g., a shaft 712, and may be configured to seal with or otherwise engage therewith. To accomplish such sealing with the shaft 112, the sealing element 702 may include one or more lips 714 and/or one or more inner profiles 716.

The outer casing 704 may include a first part 718 and a second part 720, which may be separate pieces that are attached together. The first part 718 may extend generally radially, e.g., may define or otherwise include a disk shape. In other embodiments, however, the first part 718 may extend at least partially axially, may bend, and/or may form any other suitable geometry. Further, the second part 720 may extend generally axially, e.g., may have a generally tubular shape; however, again, the second part 720 may be bent or otherwise shaped, as desired. The second part 720 may define an inner diameter $D_C$ which may be greater than an outer diameter $D_S$ of the sealing element 702, such that the second part 720 may be received around and spaced radially apart from the sealing element 702.

The sealing element 702 may also define a pocket 722 in which a radially inner portion 723 of the first part 718 of the outer casing 704 may be received. The sealing element 702 may be formed from a molded material, such as an elastomer, a plastic, or another material. The first part 718 of the outer casing 704 may be formed from a material with a higher melting point than the molded material of the sealing element 704, such as a metal, metal alloy, plastic, fiber-reinforced material (e.g., a "composite"), combinations thereof, or the like. Thus, in some embodiments, the sealing element 702 may be attached to the first part 718 during molding, e.g., using a layer of adhesive bonding material securing the material of sealing element 702 to the first part 718 of the outer casing 704. In this way, the first part 718 may serve to provide a shape to what may otherwise be a relatively deformable sealing element 702.

The first and second parts 718, 720 of the outer casing 704 may be joined together, e.g., after the sealing element 702 is formed or otherwise coupled with the first part 718. For example, the first and second parts 718, 720 may be welded together. As shown, an axial end 732 of the second part 720 may be welded, soldered, bonded, fastened, or otherwise attached to a radial surface 730 of the first part 718, forming one or more weldings, solderings, etc., at one or more connection locations 734. In the illustrated embodiment, the connection locations 734 are at the radially-inward edge between the first part 718 and the second part 720, and at the radially-outward edge therebetween. It will be appreciated that, in some embodiments, one of these connection locations 734 may be omitted or modified. Further, the connection locations 734 may be proximal to an outer circumference 736 of the first part 718. The connection between the first and second parts 718, 720 may be relatively strong and rigid, so as to prevent displacement of the first and second parts 718, 720 from one another.

In an embodiment, the first part 718 and the second part 720 may together define an outer recess 738 in which an outer seal 740 may be positioned. The outer seal 740 may be an O-ring, which may be configured to seal with an outer housing or another structure that is generally stationary relative to the outer casing 704. The recess 738 may, for example, be formed by an inward bend 742 formed in an outer circumference 743 and proximal to the axial end 732 of the second part 720. Further, the axial end 732 may be inwardly-offset from an outer circumference 736 of the first part 718, such that a radially-extending surface 745 (e.g., an outer portion of the radial surface 730), extending radially-inward from the outer circumference 736 of the first part 718, forms one side of the recess 738. The radially-extending surface 745 and the recess 738 may also serve as an engaging feature, to which an accessory (e.g., accessory 604 of FIG. 6) may be attached.

In other embodiments, the connection location(s) 734 may be located elsewhere than shown. For example, the connection location 734 may be on the outside of the outer circumference 736, such that the second part 720 extends axially over the first part 718 and is connected on a radially inner surface thereof to the first part 718. A variety of other relative orientations and positions of the connection location 134 are contemplated herein.

Although described as a two-part casing, it will be appreciated that the first part 718 of the outer casing 704 may, instead, be considered as a connecting insert (e.g., similar to the connecting insert 218 of FIG. 2A).

The seal 700 may be formed similarly to the seal 200, in accordance with an embodiment of the method 100. For example, referring to FIG. 8, there is shown a partial, side, cross-sectional view of an outer casing blank 800, which may include separate first and second parts 802, 804. The first part 802 may be modifiable to match a determined dimension (e.g., as at 104 of FIG. 1). For example, a radially-outer portion 806 of the first part 802 may be removed (e.g., cut, drilled, machined, etc.) from a remainder of the blank 800, e.g., using a die 808 (or in any other way). The remainder of the first part 802 may serve as the first part 718 of the outer casing 704, as discussed above.

Figure 8:
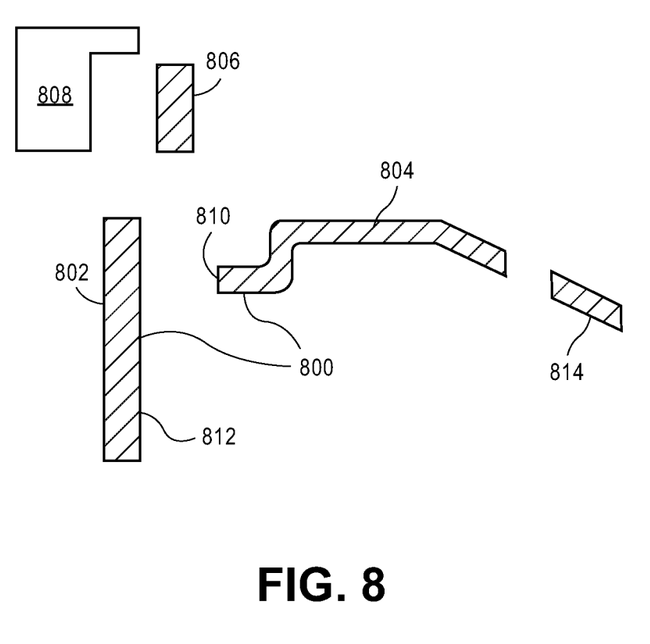
FIG. 8 illustrates a process of removing a portion of an outer casing blank, e.g., to form the outer casing of the seal of FIG. 7, according to an embodiment.

Before, during, or after removing the portion 806 of the first part 802, the second part 804 may be attached to the first part 802, e.g., by welding an axial end 810 of the second part 804 to a radial surface 812 of the first part 802.

Accordingly, in this embodiment, the second part 804 may be selected, e.g., from a plurality of different second parts 804 with a variety of outer diameter sizes, e.g., based on a bore size of a housing in which the seal 700 may be disposed. The first part 802 may be separately selected from a plurality of different first parts 802 with a desired inner diameter size, and an outer diameter that is at least as large as desired. The outer diameter of the first part 802 may then be reduced.

Further, an axial length of the second part 804 may be reduced by removing an axial portion 814 of the second part 804 (e.g., by cutting using a die, laser, lathe, mill, etc.). By removing the axial portion 814, the second part 804 may be sized to fit within a bore of a housing. In some embodiments, the axial portion 814 of the second part 804 may be removed prior to bending the second part 804, but in other embodiments, as shown, may be removed thereafter. Further, in some embodiments, the axial portion 814 may be removed prior to attaching the first and second parts 802, 804 together (e.g., with the sealing element 702 attached and/or molded to the first part 802, as shown) to avoid metal shards damaging the sealing element 702. In addition, as shown in FIG. 7, portions of the inner profile 716 and/or the sealing lip 714 of the sealing element 702 may be removed according to a determined inner diameter for the sealing element 702, e.g., as at 108 and/or 112 of FIG. 1.

Figure 9:
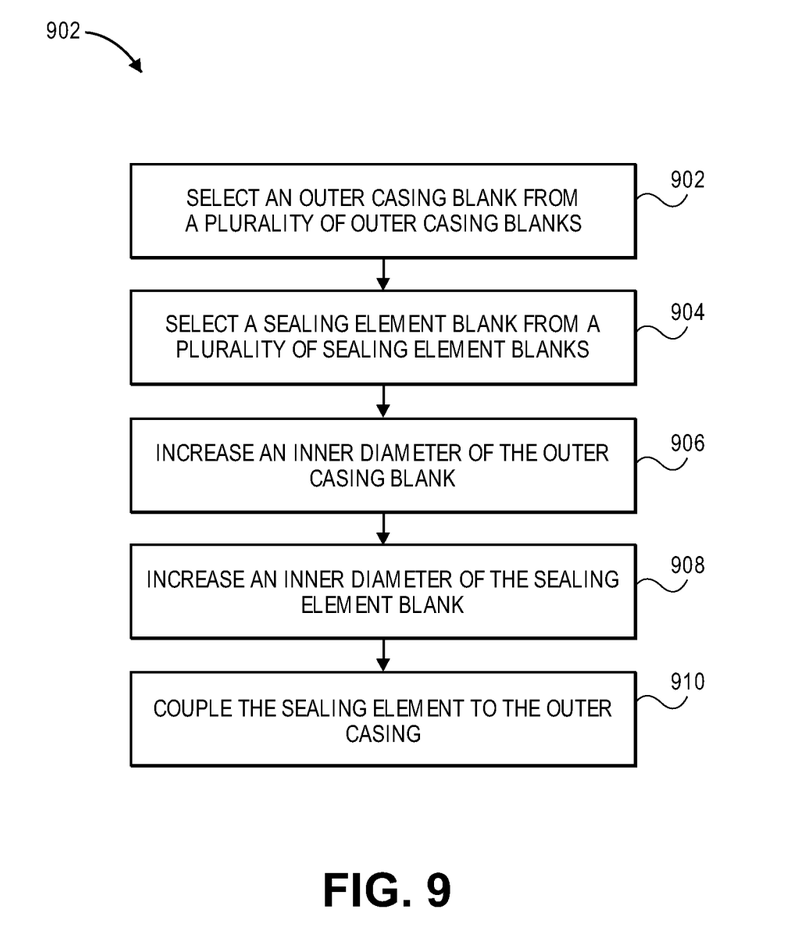
FIG. 9 illustrates a flowchart of another method for manufacturing a seal, according to an embodiment.

FIG. 9 illustrates a flowchart of another method 900 for manufacturing a seal, such as the seal 200, 250, 600, or 700, according to an embodiment. The method 900 includes selecting an outer casing blank 300 from a plurality of outer casing blanks based on an outer diameter of the outer casing blank 300, as at 902. The plurality of outer casing blanks may have varying outer diameters, so as to fit within bores of different sizes. Thus, upon specification of a bore size, one of the outer casing blanks 300 may be selected. The inner diameter sizing of the outer casing blank 300 may also be considered in the selection.

Similarly, the method 900 may include selecting a sealing element blank 400 from a plurality of sealing element blanks based on an inner diameter of the sealing element blank 400, as at 904. For example, the sealing element blank 400 may be selected such that its inner diameter is generally the same, or slightly smaller, than the known shaft size or customer specification.

The method 900 additionally includes increasing an inner diameter of the outer casing blank 300, e.g., to form the outer casing 206 (as shown in FIG. 2A), as at 906. In some embodiments, increasing the inner diameter of the outer casing blank 300 may include removing an inner portion 302 of the outer casing blank 300 (as shown in FIG. 3).

The method 900 may then proceed to increasing an inner diameter of the sealing element blank 400, as at 908. In some embodiments, increasing the inner diameter of the sealing element blank 400 may include removing a portion of a lip 402, or a portion of an inner profile 408, or both, of the sealing element blank 400 (as shown in FIG. 4).

Once the outer casing blank 300 and the sealing element blank 400 are formed into the outer casing (e.g., 206) and the sealing element (e.g., 204), the method 900 include coupling the sealing element 204 to an inner diameter surface 228 of the outer casing 206, as at 910. In some embodiments, coupling the sealing element 204 to the inner diameter surface 228 of the outer casing 206 may include receiving the inner diameter surface 228 of the outer casing 206 between a crimping extension 224 of an insert 218 and a base 222 of the insert 218, and bending the crimping extension 224 radially outward and toward the base 222, so as to entrain the outer casing 206 between the crimping extension 224 and the base 222 (e.g., as shown in FIG. 2A). In another embodiment, coupling the sealing element 204 to the outer casing 206 includes welding or soldering an insert 218 to the outer casing 206 (e.g., as shown in FIG. 2B).

In still another embodiment, as shown in FIG. 7, coupling the sealing element 702 to the outer casing 704 includes forming the sealing element 702 at least partially around an inner portion 723 of a first, radially extending part 718 of the outer casing 704. In such an embodiment, the method 900 may further include attaching a second, axially-extending part 720 of the outer casing 704 to the first part 718 of the outer casing 704.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for manufacturing a seal, comprising:
providing a generally annular sealing element, the sealing element having an inner circumferential sealing surface configured to engage with a relatively movable member, and an outer casing including a generally axially-extending section and a generally radially-extending section extending inwardly from the axially-extending section;
determining a desired diameter for the outer casing;
removing a portion of the radially-extending section, such that a diameter of the outer casing is about equal to the desired diameter;
embedding a connecting insert at least partially in a pocket of the sealing element; and
coupling the sealing element to the outer casing by connecting the outer casing to the connecting insert that was embedded at least partially in the pocket of the sealing element, after removing the portion of the provided one of the radially-extending section.

2. The method of claim 1, wherein:
the radially-extending section comprises annular disk;
the axially-extending section comprises a generally cylindrical tube a is separate from the annular disk; and
removing the portion of the outer casing includes removing a radially-outer section of the annular disk.

3. The method of claim 2, further comprising connecting the tube to the disk after removing the radially-outer section of the annular disk.

4. The method of claim 1, wherein embedding the connecting insert comprises forming the sealing element at least partially around the connecting insert.

5. The method of claim 1, wherein coupling the sealing element to the outer casing includes entraining a portion of the outer casing between a crimping extension of the connecting insert and a base of the connecting insert.

6. The method of claim 1, wherein coupling the sealing element to the outer casing comprises welding or soldering the insert to the outer casing.

7. The method of claim 1, wherein:
providing the outer casing includes providing the radially-extending section, and removing the portion of the outer casing includes removing a radially-inner portion of the radially-extending section of the outer casing.

8. The method of claim 1, further comprising:
determining a diameter for a lip of the sealing element; and
removing a portion of the lip of the sealing element, such that the diameter of the sealing element is about equal to the determined diameter for the lip.

9. The method of claim 1, further comprising removing an axial portion of the axially-extending section.

10. The method of claim 1, further comprising providing one or more engaging features for connecting with one or more accessories, the one or more engaging features being attached to or integral with the outer casing, the sealing element, the insert coupled with the sealing element, or a combination thereof.

11. A method of manufacturing a seal for sealing about a shaft, the method comprising:
providing a casing blank having a generally axial section and a generally radial section extending inwardly from the axial section;
providing a sealing element, wherein an inner diameter of the sealing element is sized to sealingly engage with the shaft;
removing an inner portion of the generally radial section of the casing blank such that the radial section has an inner diameter sized to receive the sealing element;
embedding a connecting insert at least partially in a pocket of the sealing element; and
coupling the sealing element to the casing blank by connecting the casing blank to the connecting insert that was embedded at least partially in the pocket of the sealing element.

12. The method of claim 11, further comprising;
determining a desired axial dimension for the casing blank; and
removing an axial portion of the generally axial section of the casing blank such that the axial section has an axial dimension that is about equal to the desired axial dimension.

13. The method of claim 12, wherein the insert comprises a crimping extension and a base, the base being received into the pocket of the sealing element, wherein coupling the sealing element with the casing blank includes welding or soldering the insert to the casing blank.

14. The method of claim 11, further comprising removing a portion of a lip of the sealing element.

15. The method of claim 11, wherein the insert comprises a crimping extension and a base, the base being received into the pocket of the sealing element, wherein coupling the sealing element with the casing blank includes:
receiving at least part of the radial section of the casing blank between the crimping extension and the base of the insert; and
bending the crimping extension toward the base, so as to entrain the at least a part of the radial section of the casing blank between the crimping extension and the base.

* * * * *